Jan. 12, 1960 C. R. TURNBLADE 2,920,676
STRETCH WRAP FORMING MACHINE
Filed July 20, 1955 3 Sheets-Sheet 1

INVENTOR.
CHARLES R. TURNBLADE
BY
Edwin Coates
- ATTORNEY -

Jan. 12, 1960
C. R. TURNBLADE
2,920,676
STRETCH WRAP FORMING MACHINE
Filed July 20, 1955
3 Sheets-Sheet 2
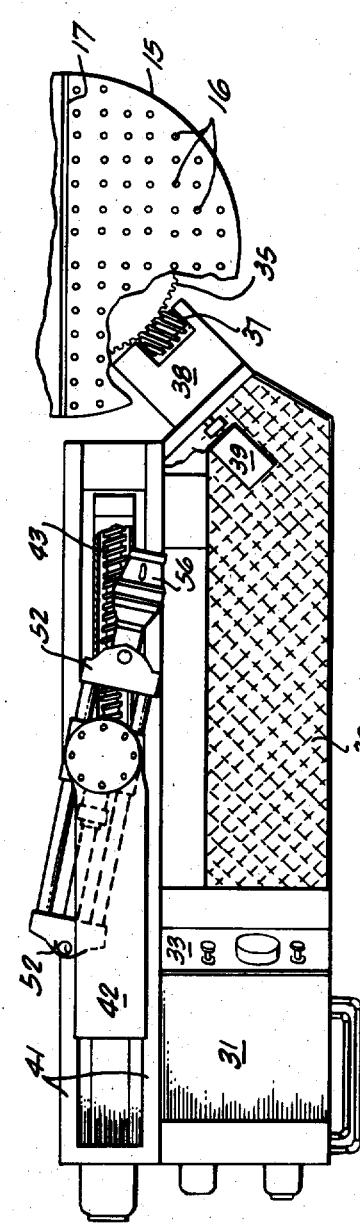
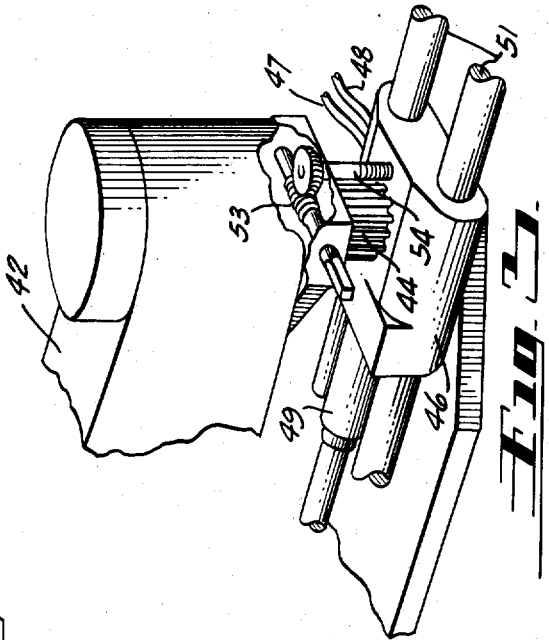
INVENTOR.
CHARLES R. TURNBLADE
BY
Edwin Coates
ATTORNEY.

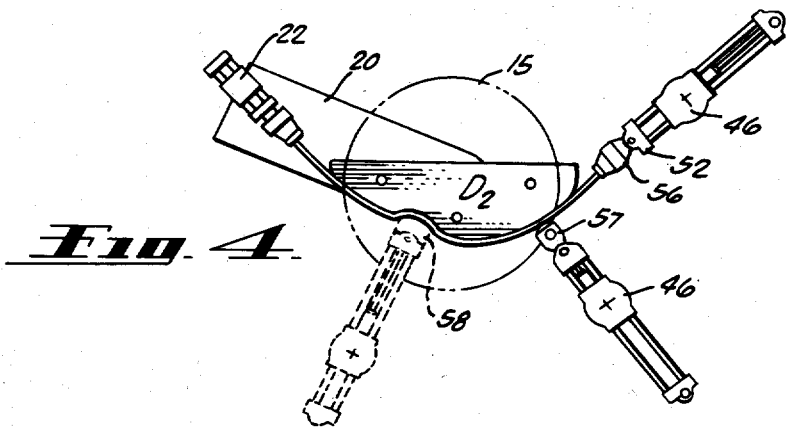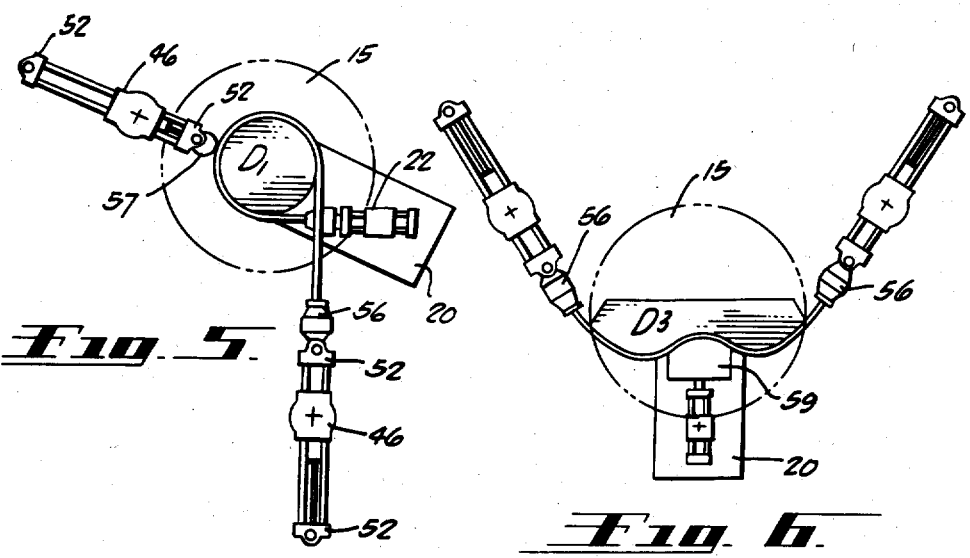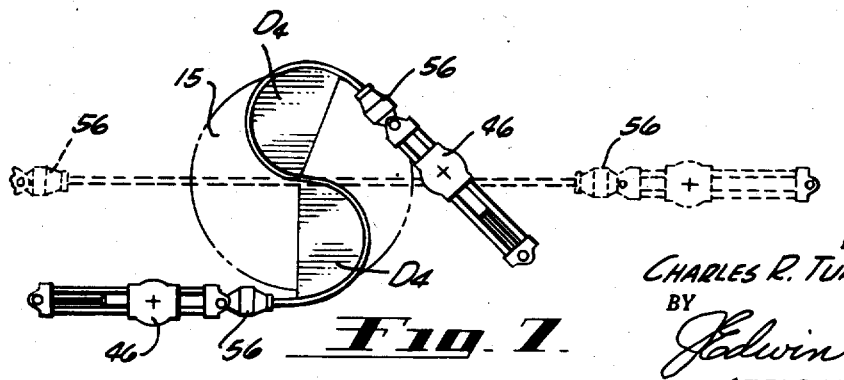

United States Patent Office 2,920,676
Patented Jan. 12, 1960

2,920,676
STRETCH WRAP FORMING MACHINE

Charles R. Turnblade, Los Angeles, Calif., assignor to Douglas Aircraft Company, Inc., Santa Monica, Calif.

Application July 20, 1955, Serial No. 523,175

3 Claims. (Cl. 153—32)

This invention relates to metal working apparatus and more particularly to a machine for forming stock material, such as rods, tubes, bars and the like, by initially stretching the material slightly beyond its elastic limit and then winding the material about a form block of any desired contour.

The machine of this invention comprises essentially a fixed base having a horizontally disposed work table thereon to which die blocks and auxiliary power gripping and metal forming arms can be attached. Radiating from and pivotally mounted about the base are a plurality, preferably two, of independently movable support arms each carrying a sliding yoke. The sliding yoke in turn provides a support for a vertically adjustable power cylinder for performing such functions, with respect to the stock material, as gripping and stretching, wiping, rolling and joggling.

While there are a variety of other known machine utilizing the stretch-wrap principle for shaping elongated metal structural pieces, such other machines are limited in their ability to form material to a narrow selection of contours. This limitation is imposed primarily by the inability of the material gripping jaws to move independently in either direction about the die blocks and also their inability to swing an arc of more than 180°.

Since the present construction enables the speed and direction of each arm to be independently controlled, it is possible, when one arm is used as a wiper, to maintain such arm at the tangent point of bend or to vary its relationship to the tangent point if desired. Further, it is possible to make multiple wiping passes over the material after it has been wrap formed to insure the close conformance of the stock part to the die.

It is a further capability of the present machine to shape material about a 360° or greater die block. In this operation the material is gripped at one end by a stationary jaw attached to the work table, the other end being gripped by one of the pivotally mounted jaws. By virtue of its vertical adjustability, the pivoted jaw can be moved upwardly as it traverses the arc and can pass above the stationary jaw to allow the swing of more than 360°. In using the machine in this manner, a spiral die block is used; yet, when the formed part is removed therefrom, it is easily, and without adverse effect sprung back if desired to a planar form.

Each of the gripping jaws of the present machine is so constructed as to permit the application of a constant or controlled tension force to the stock part throughout the forming operation. Further each of the yokes supporting the jaws is slidably mounted on its associated support arm and is moved therealong preferably by a piston-cylinder or a screw arrangement. In this manner the gripping jaws may be moved radially of the die block to compensate for the take-up of material as it is made to conform to the die. Additionally, the power cylinders are pivotally mounted to the yoke so that the direction of application of tension force to the part will always be tangential to the curvature of the die block.

Since it is at times desired to apply tension to the stock material, as in stretch forming, and at other times to apply a compression force, as in wiping and joggling, I have provided opposite ends of the power cylinders with tool holding means. In this manner the cylinders only need be swung 180° about their pivots to convert from tension applying to compression applying and vice versa.

Other features and advantages of the present invention will be apparent from the understanding of the accompanying description and drawings in which:

Figure 2 is a fragmentary plan view, with parts broken away, of the machine of Figure 1;

Figure 3 is a fragmentary perspective view illustrating certain features of the mounting for the power cylinders of the present machine; and Figures 4, 5, 6, and 7 are partially diagrammatic representations respectively showing wiping and joggling, full circle bending, bulldozing, and shaping S or reverse bend contours as performed by the machine of Figure 1.

Figure 1:
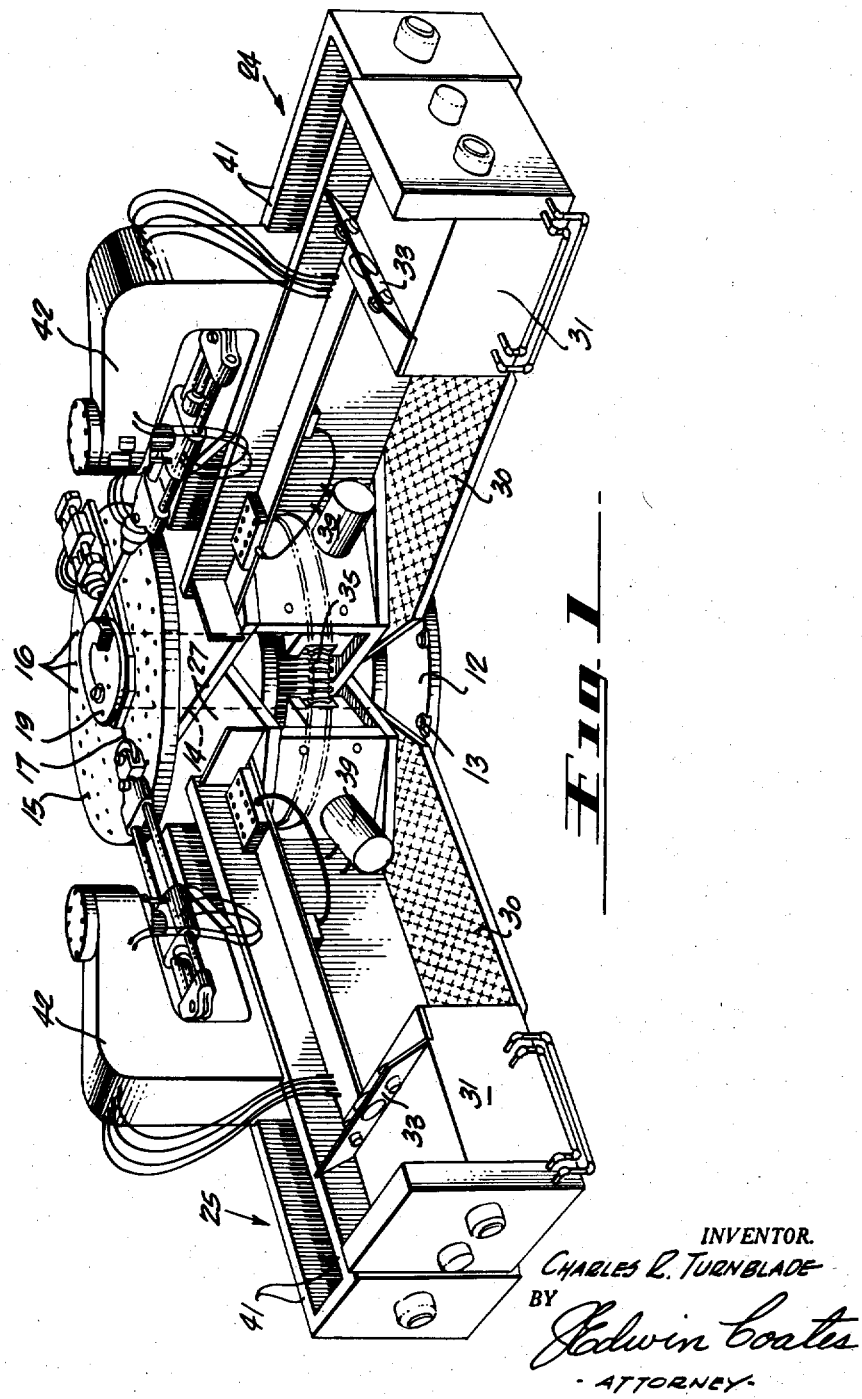
Figure 1 is a perspective view of a species of a machine incorporating the features of the present invention.

Now referring to Figures 1 and 2, the machine therein comprises a pedestal 12 for secure affixation to a permanent base, such as a shop floor, as by anchor bolts 13. Projecting substantially vertically upwardly from pedestal 12 is a central or main bearing post 14 to the top of which is non-movably attached a generally circular work table 15. Uniformly distributed over the major portion of the face of work table 15 are a plurality threaded bores 16 and a diametrically extending T or dovetail slot 17. Through the utilization of the dispersed bores 16 any one of selection of die blocks, such as the full circle die $D_1$ shown in Fig. 1, may be bolted to table 15 at any convenient working position. Radially movable, and lockable at any position, of the table 15 is a support pad 20 having a downwardly extending projection (not shown) interlocking with diametrical slot 17. For a purpose more fully defined hereinafter, an auxiliary power arm 22 is mounted for free pivotal motion on pad 20 and is adapted to have any one of multiple metal gripping or working tools actuated thereby.

As shown in Figure 1, emanating from the pedestal 12 is a pair of swinging frame or arm members 24, 25, each being a substantial duplicate of the other. For the purpose of simplification like reference numerals will be used to designate corresponding parts of frames 24 and 25. These frames 24, 25 are pivotally attached to central post 14 by upper and lower hinge ears 27, 28 and extend as cantilevers outwardly, or, alternately, may have their outward extremity supported by rollers (not shown) to provide partial relief from internal strain due to the extreme mass of the arms.

Each frame member 24, 25 includes an operator platform 30 and a housing 31 in which are enclosed various portions of the hydraulic mechanisms, such as pumps, valving, reservoirs etc., required for the operation of parts referred to hereafter. An instrument panel 33 is appropriately situated at one end of platform 30 so that the operator can readily determine the degrees of pressure, liquid level etc. existing in the mechanisms within housings 31.

To effectuate movement of frames 24, 25 about their pivotal axis, a circular rack 35 is fixedly attached to post 14 for coaction with worm 37, on each of arms 24, 25, which is driven through reduction gear box 38 by fluid motor 39. The motor 39 is a reversible, variable speed type.

Extending longitudinally of swinging arms 24, 25 are guides or ways 41 on which are reciprocably mounted yokes 42 driven therealong by a variable speed, reversible feed screw 43 (see Fig. 2). In the bight of yoke 42 is rotatively affixed a vertical splined shaft 44 on which is keyed a block housing 46 through which is led inlet 47 and exhaust 48 lines for hydraulic cylinder-piston unit 49. Parallel with each other and with the direction of action of piston-cylinder unit 49 there are disposed a pair of slide guides supports 51 having a tool holder 52 attached to each end thereof. As will be subsequently explained the nature of the tool and the end of the slide guide support 51 to which the tool is attached will vary in accordance with the type of metal shaping operation being performed. Still referring to Fig. 3, there is shown a means of affording vertical adjustability to block housing 46 which comprises a worm-rack drive 53 for adjusting screw 54 threaded into block 46. The drive 53 is manually actuated by a crank (not shown) fitted onto the non-circular end of the worm shaft of drive 53.

While the hydraulic pressure system is not shown and the details of such do not form a part of the present invention, it is to be understood that it is contemplated to employ one of the various known systems capable of maintaining piston cylinder unit 49 under constant pressure or one which maintains unit 49 under the proper pressure to produce the desired ratio between the elongation of the stock part and the unformed length of stock part.

When the apparatus is to be used for stretch forming, wiping and joggling as diagrammatically shown in Fig. 4, auxiliarly unit 22 and one of the tool holders 52 carried by a swinging arm 24 are equipped with a vise type stock grip 56. The screw 43 is operaated to move the yoke 42 away from the table 15 so that the length of the stock can be accommodated between the grips 56. Side face die $D_2$ is bolted to table 15, care being taken to position it properly with relation to auxiliary unit 22. The second swing power unit 46 is provided with a wiping roller 57, the unit being oriented to force the roller 57 against die $D_2$. The stock part is then gripped and stretch wrapped about die $D_2$ and the contour is wiped or rolled in by roller 57. The wiping pressure, speed and direction is separately controlled during the wrapping cycle to satisfy any varying factors, such as number of passes required, governing the operation. As the stock is wrapped about die $D_2$ feed screw 43 is adjusted to feed yoke 42 toward the table 15 at a speed approximately adequaate to compensate for the takeup of the stock about the die. This speed need not be finely adjusted, for inequality between feed in and takeup is balanced by operation of the constant pressure hydraulic system acting on piston-cylinder unit 49. After the wiping operation is completed the wiping roller 57 is replaced by joggle block 58, the piston-cylinder unit 49 moved to a position and locked opposite the point to be joggled, and power applied to press joggle block 58 against the work to form the desired configuration. During the joggling operation the work is maintained under constant tension between jaws 56, 56. After completion of the stretch-forming, wiping and joggling the pressure to all power cylinders 49 is reliever and the formed part removed.

When full circle forming, as represented in Figure 2, the same operation is performed as explained above with respect to stretch forming and rolling. In that a spiral side faced die is the most practical to use in full circle forming. To maintain the jaw 56 and roller 57 at the proper level as they traverse the 360° arc the operators first set the drive mechanisms into operation after which the apparatus operates substantially automatically. As the arc is swung the wiper and wrapping arms are progressively adjusted vertically by the worm-screw arrangement 53 shown in Figure 3. The auxiliary tension cylinder 22 is so dimensioned to permit both swinging arms 24, 25 to pass thereover.

The reverse bending or bulldozing operation as shown in Figure 6, somewhat similar to joggling (Figure 4), is carried out by first gripping the part in a straight position between jaws 56, 56. The reverse portion of the contour is then formed by pressuring bend block 59 against the metal part while maintaining constant tension therein. Maintaining the part firmly between die $D_3$ and block 58, the arms 24, 25 carrying jaws 56, 56 are subsequently rotated toward each other to form the part to the curvature of die $D_3$.

The fourth type of metal forming as shown in Figure 7 is a reverse bending operation wherein an S contour is the resulting configuration imposed on the part. In this type of operation a die $D_4$ consisting of two separate contour blocks mounted on a common sub plate is utilized. In effecting this configuration the stock part is gripped in the straight condition, as shown in phantom lines in this figure, and the initial stretching force applied. Both arms 24, 25 respectively carrying jaws 56, 56 are rotated in the same direction to wrap the part about the die $D_4$, the speed of rotation of each of arms 24, 25 being independently regulated as dictated by the part profile.

While several types of metal forming operations have been specifically disclosed, it will be evident that the machine embodying the present invention is capable of application to many other types of work involving wrapping stock about a die face. The machine too is capable of operating equally well on bar and sheet rock.

Although the presently preferred embodiment of this invention has been shown and described, it is to be understood that the invention is susceptible to variation in form and construction within the scope of the appended claims.

I claim:

1. A contour forming machine of the type defined comprising: a work table; a side-faced die and a fixed auxiliary metal gripping jaw both on said table; a pair of arms extending generally radially of said table and movable entirely therearound, each of said pair of arms being independently controllable in speed and direction; a piston-cylinder assembly on each of said pair of arms; a material gripping jaw actuated by the assembly on one of said pair of arms, the said jaws being adapted to hold a piece of stock material therebetween and apply a tension force thereto upon the actuation of the second said jaw by the piston-cylinder assembly; means to move the second said jaw towards the table upon rotation of the arm carrying the second said jaw when the material is wrapped about the die whereby to compensate for material take-up on the die; and the other arm of said pair of arms having thereon a metal working tool actuated by the associated piston-cylinder assembly, the tool being compressively urged against the material after it has been wrapped about the die whereby the material may be closely conformed to the die.

2. A contour forming machine of the type defined comprising: a base; a work table fixed to said base; a side faced die supported on the work table; a first jaw for gripping one end of a work piece to be shaped on the die; a second jaw for gripping the other end of the work piece; power operated means urging the second jaw away from the first jaw whereby to exert a tension force on the work piece; means for moving the second jaw about said die whereby the work piece can be moved around the die and into conformance therewith; a wiper tool pressurally urged radially toward the die to press the work piece against the die; reversible means moving the wiper tool circumferentially of the die, said reversible means being controllable independently of the means for moving the second jaw whereby the wiper tool may be moved back and forth across the work simultaneously with the moving of the second jaw.

3. A metal forming machine of the type defined comprising: a base; a work table fixed to said base; a side faced die on the work table; a first jaw on the table for gripping one end of a work piece; a second jaw for gripping the other end of the work piece; power means moving the second jaw away from the first jaw to exert a tension force on the work piece; means rotating the second jaw about the work table to wrap the work piece about the face of the die; a wiper tool pressurally urged toward the die to force the work piece against the die; means supporting the wiper tool and being movable about the table independently of the means rotating the second arm; and additional means moving the second jaw and the wiper tool radially of the table for respectively compensating for material take up on the die and for relative changes in distances between the means supporting the wiper tool and the face of the die.

References Cited in the file of this patent

UNITED STATES PATENTS

| | | |
|---|---|---|
| 567,811 | Lefevre | Sept. 15, 1896 |
| 1,385,542 | Hardy | July 26, 1921 |
| 1,900,160 | Cipko | Mar. 7, 1933 |
| 2,413,524 | Shaw | Dec. 31, 1946 |
| 2,514,830 | Bath | July 11, 1950 |
| 2,515,734 | Rathgen | July 18, 1950 |
| 2,515,752 | Weightman | July 18, 1950 |
| 2,536,738 | Green | Jan. 2, 1951 |
| 2,619,149 | Self | Nov. 25, 1952 |
| 2,713,376 | Bath | July 19, 1955 |
| 2,734,548 | Fredericks | Feb. 14, 1956 |
| 2,743,756 | Fredericks | May 1, 1956 |
| 2,810,421 | Dolney | Oct. 22, 1957 |

FOREIGN PATENTS

| | | |
|---|---|---|
| 266,761 | Germany | Oct. 30, 1931 |
| 285,858 | Switzerland | Jan. 16, 1953 |